United States Patent
Pautonnier

(10) Patent No.: US 6,961,589 B2
(45) Date of Patent: Nov. 1, 2005

(54) METHOD OF TRANSMITTING BETWEEN A BASE STATION IN AN ACCESS NETWORK AND AN ACCESS NETWORK CONTROLLER OF A TELECOMMUNICATIONS SYSTEM

(75) Inventor: Sophie Pautonnier, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 551 days.

(21) Appl. No.: 09/802,919

(22) Filed: Mar. 12, 2001

(65) Prior Publication Data

US 2001/0021661 A1 Sep. 13, 2001

(30) Foreign Application Priority Data

Mar. 13, 2000  (FR) .............................. 00 03338

(51) Int. Cl.⁷ ................................ H04Q 7/00
(52) U.S. Cl. .................... 455/561; 370/310.2
(58) Field of Search ................ 455/560, 561, 455/562.1, 310.21; 370/310.1, 310.2

(56) References Cited

U.S. PATENT DOCUMENTS

| | | | | |
|---|---|---|---|---|
| 5,499,238 A | * | 3/1996 | Shon | 370/399 |
| 6,504,845 B1 | * | 1/2003 | Petersen et al. | 370/412 |
| 6,597,669 B1 | * | 7/2003 | Takahashi et al. | 370/325 |
| 6,639,916 B1 | * | 10/2003 | Wakizaka | 370/397 |

FOREIGN PATENT DOCUMENTS

| | | |
|---|---|---|
| EP | 0 810 808 | 12/1997 |
| EP | 0 820 165 | 1/1998 |
| EP | 0 843 499 | 5/1998 |

OTHER PUBLICATIONS

Michael G. Hluchuj, et al., IEEE Proceedings of the International Conference on Communications, pp. 990–996, "Queueing Disciplines for Integrated Fast Packet Networks", Jun. 14, 1992.

* cited by examiner

*Primary Examiner*—Nick Corsaro
(74) *Attorney, Agent, or Firm*—Oblon, Spivak, McClelland, Maier & Neustadt, P.C.

(57) ABSTRACT

A method of transmitting, over a physical link between a base station and a controller of a telecommunications system, data issuing from a users communicating with the base station, the data segmented in cells, the system designed so that the cells are sent over the link at different transmission time intervals. As many queues as there are different types of data which the telecommunications system can manage are used, the queues being fed by the cells carrying the data, each queue being fed by the cells to which the type of data corresponding to the queue is allocated, the queues being emptied in time periods with a predetermined duration in the following manner: at the commencement of each period, the first non-empty queue, in increasing order of the said time intervals allocated to the queues, is emptied, then the second non-empty one is emptied.

3 Claims, 2 Drawing Sheets

METHOD OF TRANSMITTING BETWEEN A BASE STATION IN AN ACCESS NETWORK AND AN ACCESS NETWORK CONTROLLER OF A TELECOMMUNICATIONS SYSTEM

BACKGROUND OF THE INVENTION

1. Field of the Invention

The present invention concerns a method of transmitting, over a physical link between a base station in an access network and an access network controller in a telecommunications system, for example telecommunications for mobile stations, data emitted by a plurality of user stations in communication with the said base station.

The present invention finds an application when the data sent by the different user stations can be of different types, such as for example voice data, data strictly speaking, image data, etc. It is known that different constraints apply to each type of data.

2. Discussion of the Related Art

Generally, on a link connecting a base station in an access network and a network controller, itself being connected to an interconnection network federating a plurality of access networks, these data are in a form segmented into cells (a generic term which, in the context of the present invention, can designate either cells proper such as ATM cells, or mini-cells such as the cells also known to persons skilled in the art as AAL2 cells). As will be understood through the remainder of the description, these cells are such that they must be sent at a certain number of transmission time intervals TTI which are different according to the type to which they belong.

First of all, it should be stated that, with regard to telecommunications, the functions implemented in an appliance, whether a receiver, a transmitter or other, are grouped together in assemblies which are referred to as layers and between which blocks of data are passed which, in the incoming direction and in the outgoing direction, are referred to as protocol data units and denoted PDU.

More particularly, in a radio telecommunications system, in the user plane, two essential layers are used for transmitting information over a physical link: layer 1 or transportation layer providing the functions related to the transportation of information from each user liable to use the link in question, and layer 2 or radio link relating to the radio control functions defining, for example, logic channels corresponding to dedicated and common traffic.

FIG. 1 depicts layer 1 and layer 2 of a radio telecommunications system. Layer 2 consists essentially on the one hand of a sublayer grouping together a plurality of radio link control units $RLC_1$ to $RLC_N$ designed respectively to receive from upstream layers the data to be transmitted over the physical link and on the other hand a sublayer for access to the MAC (Medium Access Control) support provided for preparing the data and transmitting them to the layer 1.

In the radio link control RLC sublayer, the data are thus segmented so as to form protocol data units referred to as RLC-PDU.

The RLC-PDU units of several users are then sent to the medium access control MAC sublayer.

This MAC sublayer allows management of the multiple access to the only physical link in question and will therefore form MAC-PDU protocol units. For each user, these MAC-PDU units are sent to the physical layer of the base station at a rate which is characterised by a transmission time interval TTI (for example, a multiple of 10 ms: 10, 20, 40 or 80) specific to the type of data which the user in question wishes to transmit and therefore to the type of traffic which he envisages. For example, voice data traffic will have a transmission time interval TTI which is 20 ms and will be transported in small packets (for example 244 bits). Contrary to this, web or ftp data traffic can have a transmission time interval TTI of 80 ms and will be transported in packets of relatively large size (for example 3848 bits).

This MAC sublayer is controlled by a radio resources management unit RRC which will determine the number of MAC-PDU protocol units to be sent to the physical layer according to the capacity and availability of the physical link at the time in question. It should be noted that in this way the MAC sublayer cannot send to the lower sublayers data which they could not process.

Once their number has been determined, these MAC-PDU units are assembled in a frame so as to form FP-PDU (Frame Protocol PDU) protocol units, which are passed to the layer 1 in order to ensure their transportation over the physical link. In addition, the headers of these FP-PDU units contain CFN (Connection Frame Number) time stamps indicated by the MAC sublayer. These stamps make it possible to know the precise instants, in terns of frame, when the useful information respectively carried by these FP-PDU units will be transmitted over the radio link.

It should be noted that, unlike what happens in the higher layers, all the data at the output from the MAC layer become more or less real time because they carry a time stamp. Nevertheless, the different traffics concerned are differentiated through their values of the transmission time interval TTI.

The FP-PDU units are then transported over a network of the AAL2 type and can, if necessary, be segmented. At the output from the AAL2 layer, AAL2 mini-cells are found each corresponding to a type of traffic (voice, data, etc) which are then encapsulated in ATM cells (ATM layer). These AAL2 mini-cells are delivered by the corresponding ATM layer at times which are determined by an algorithm, for example such as the EDF (Earliest Deadline First) algorithm or FCFS (First Come First Served) algorithm, as a function of the stamps contained in the FP-PDU units.

The question which is posed is that of knowing when to send these AAL2 cells over the physical link. If known algorithms are used for doing this, all the AAL2 cells corresponding to the information of the same type, and therefore provided with the same transmission time interval TTI, will be found with the same priority, because they all have the same CFN stamp. AAL2 cells, and then ATM cells issuing from the same FP-PDU unit, and therefore of the same type, will follow each other without cells of another type appearing.

For example, a first type of data whose FP-PDU protocol units are of large size and which have a transmission time interval TTI which is relatively high will give rise to a train of cells complying with this TTI. Each FP-PDU unit can have a size of 3853 octets for a TTI of 80 ms. The number of ATM cells in the resulting train of cells is for example 86, which transmitted with a rate of 1.5 Mbits/s requires 24 ms of transmission time, therefore less than the TTI of 80 ms. However, the duration of transmission of this train may prove greater than the transmission time interval TTI for a second type of data, which, since it may not have priority with regard to its CFN stamp, cannot therefore be transmitted in compliance with its transmission time interval TTI. This second type is of the voice type whose TTI is 20 ms.

BRIEF SUMMARY OF THE INVENTION

In general terms, the present invention concerns a method of transmitting, over a physical link between a base station and a controller of a telecommunications system for data issuing from a plurality of users in communication with the said base station, the said data being segmented in the form of cells, the said system being designed so that the said cells are transmitted over the said link at transmission time intervals which are different according to the type to which they belong.

The aim of the present invention is therefore to propose a method which allows the transmission of data flows of large quantity, for example IP traffic, without disadvantaging the voice traffic, which is certainly of lower quantity but which is rigorous in terms of time interval between cells.

To this end, the said method consists of using as many queues as there are different types of data which the telecommunications system can manage, the said queues being fed by the cells carrying the said data, each queue being fed by the cells to which there is allocated the type of data corresponding to the said queue, the said queues being emptied by time slices with a predetermined duration in the following manner:

at the commencement of each slice, the first non-empty queue, in increasing order in the said time intervals allocated to the said queues, is emptied, and then the second non-empty one is emptied, and then the third non-empty one, etc, and at the expiry of the said time slice, the cycle recommences, whatever the state of the said queues.

For example, the said predetermined duration is equal to a duration equal to at most the smallest time interval in the said system.

Advantageously, the said method is implemented between the segmentation sublayer of the layer for adapting to the transportation layer and the common part sublayer of the same layer.

BRIEF DESCRIPTION OF THE DRAWINGS

The characteristics of the invention mentioned above, as well as others, will emerge more clearly from a reading of the following description of an example embodiment, the said description being given in relation to the accompanying drawings, amongst which.

DETAILED DESCRIPTION OF THE INVENTION

Figure 1:
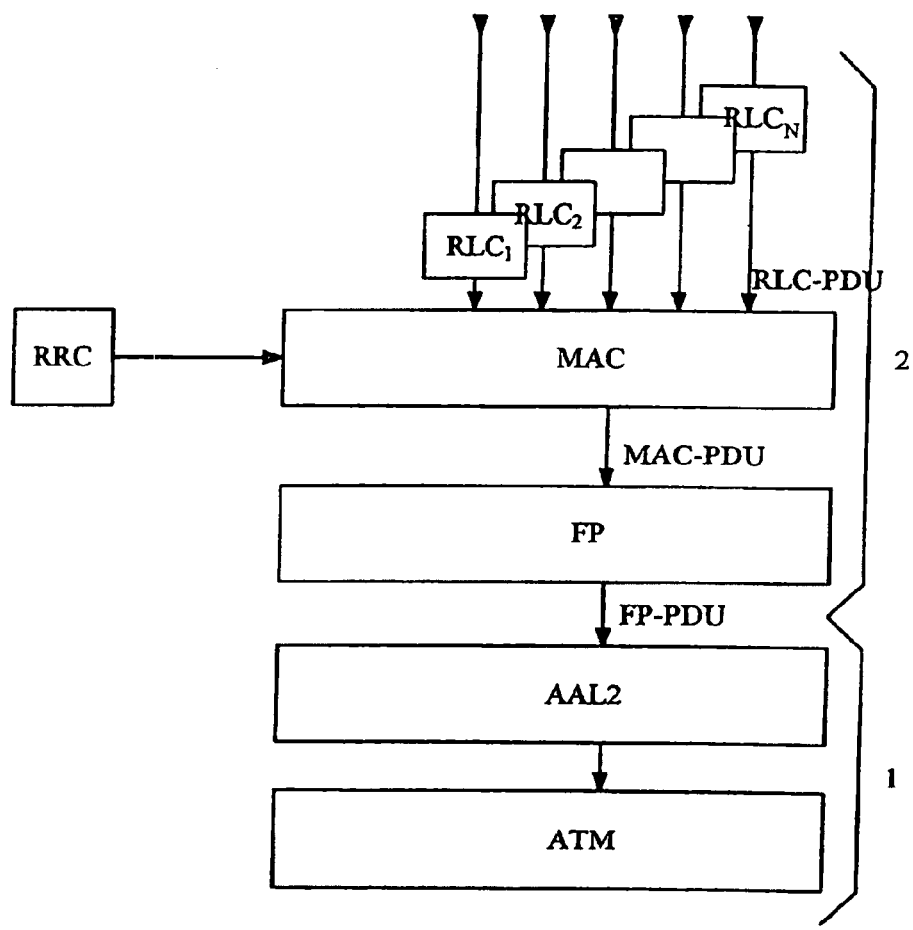
FIG. 1 shows the composition of the transportation and radio layers used on the interface between a base station in an access network and an access network controller in a telecommunications system.

The present invention notably finds an application in a telecommunications system in which the functions and their distribution in different layers follow the composition depicted in FIG. 1.

Figure 2:
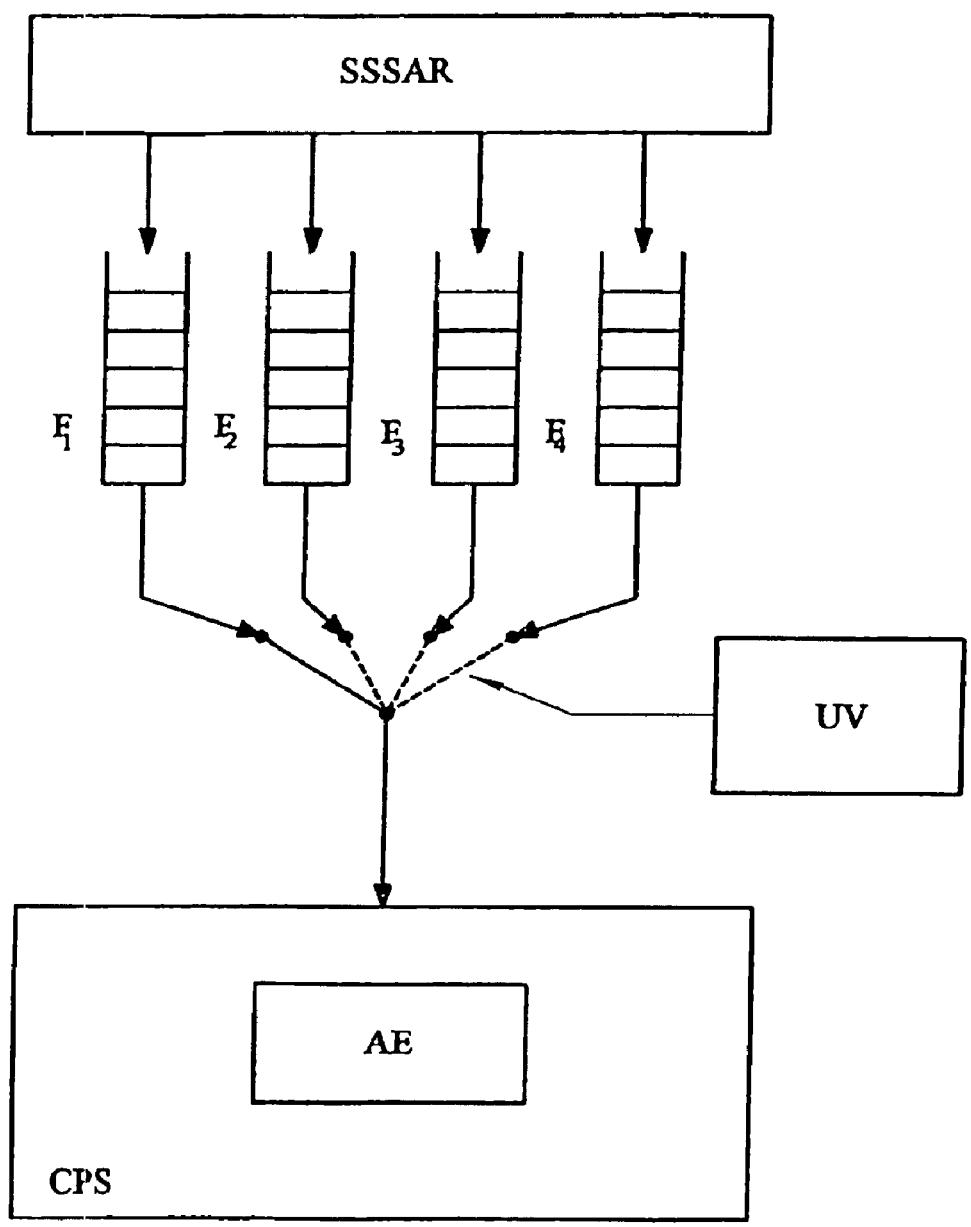
FIG. 2 is a schematic view of the transportation layer where the method of the present invention is implemented.

The present invention consists of creating as many queues as there are TTI values available on the system, as depicted in FIG. 2. These queues $F_1$ to $F_K$ are fed by the cells, for example the AAL2 cells, resulting from the segmentation of the data units, for example the FP-PDU units, of the users in communication. More particularly, each queue $F_i$ is fed by the cells to which the TTI corresponding to this queue $F_i$ is allocated.

For example, as is the case in FIG. 2, if the system has four possible TTI values (10 ms, 20 ms, 40 ms and 80 ms), four queues $F_1$ to $F_4$ will be used. The queue $F_1$ will be allocated to the shortest interval of 10 ms and will receive only the cells which are allocated to the said interval, the queue $F_2$ to the interval of 20 ms, the queue $F_3$ to the interval of 40 ms and the queue $F_4$ to the interval of 80 ms.

At the origin time $t_0$ of each time slice at most equal to the shortest time interval $TTI_{min}$ in the system (in the above example 10 ms), the first non-empty queue $F_i$ is begun to be emptied in the increasing order of the time intervals allocated to them. If this queue is emptied before the end of the said time slice, that is to say at a time t less than $t_0+TTI_{min}$, the following one is passed to. In addition, if a queue $F_i$ is empty, the following one is also passed to. Finally, at the expiry of the time slice in question, the process is recommenced.

For example, at the time $t_0$ of a time slice with a duration of 10 ms, the first step is to empty the queue $F_1$. If it has finished being emptied before time $t_0+10$ ms, the queue $F_2$ is passed to. If the queue $F_2$ has been emptied before time $t_0+10$ ms, queue F3 is passed to, etc. When a queue $F_i$ is empty, the following one is passed to directly in increasing order of the time intervals allocated to them. As soon as time $t_0+10$ ms is reached, the first non-empty queue is returned to, for example the queue $F_1$.

It should be noted that the number of cells which are present in the queues $F_1$ to $F_K$ and which are to be sent over the physical layer cannot be greater than the number of cells which the physical layer can support, having regard to the transmission time intervals. This is because it is the unit managing the radio resources RRC which determines the number of MAC-PDU protocol units, and therefore finally the number of cells, to be sent to the physical layer as a function of the capacity and availability of the physical link at the moment in question.

Thus, in this way, all the data can be sent without disadvantaging any traffic.

At the exit of each queue, it is then possible to apply a scheduling algorithm, such as a known algorithm, for sending the cells over the physical layer.

FIG. 2 depicts the implementation of the present invention in the AAL2 layer itself and, more precisely, between on the one hand the segmentation sublayer known as SSSAR (Service Specific Segmentation and Reassembly) which, as its name indicates, provides the segmentation of the data units which it receives into AAL2 mini-cells of variable size, and on the other hand the CPS (Common Part Sublayer) which includes amongst other things the scheduling algorithm.

In FIG. 2, four queues $F_1$ to $F_4$ can therefore been seen, whose emptying is controlled by an emptying unit UV.

What is claimed is:

1. A method of transmitting data over a physical link between a base station and a controller of a telecommunications system, the data segmented into cells, the system configured to send the cells over the link at time intervals corresponding to a type of the data, the method comprising:

providing different types of data to corresponding different queues;

emptying non-empty queues in an order from the queue having the data with a shortest transmission time interval to a queue having the data with a longest transmission time interval during a time period having a predetermined duration; and repeating the emptying after the expiration of the time period regardless of a state of the queues.

2. The method according to claim 1, wherein the predetermined duration is equal to the shortest transmission time interval.

3. A data transmission method comprising:

implementing the method according to claim 1 or 2 between a segmentation sublayer of a layer for adaptation to a transportation layer and a common part sublayer of the layer for adaptation.

* * * * *